Dec. 16, 1969   P. R. CHEESEMAN   3,484,770
MALFUNCTION ALARM ANNUNCIATOR
Filed Sept. 1, 1966   3 Sheets-Sheet 1

MALFUNCTION ALARM SYSTEM BLOCK DIAGRAM
ILLUSTRATING THE USE OF RELAYS TO ISOLATE
CIRCUITS

BLOCK DIAGRAM OF A TYPICAL ALARM UNIT AND
CHART SHOWING OPERATIONAL STEPS

GENERAL PURPOSE PLUG-IN RELAY BASE DIAGRAM

INVENTOR.
BY PHILIP R. CHEESEMAN

Dec. 16, 1969     P. R. CHEESEMAN     3,484,770

MALFUNCTION ALARM ANNUNCIATOR

Filed Sept. 1, 1966     3 Sheets-Sheet 2

INVENTOR.

PHILIP R. CHEESEMAN

BY

INVENTOR.
BY PHILIP R. CHEESEMAN

3,484,770
MALFUNCTION ALARM ANNUNCIATOR
Philip R. Cheeseman, Princeton, N.J., assignor to the United States of America as represented by the United States Atomic Energy Commission
Filed Sept. 1, 1966, Ser. No. 577,117
Int. Cl. G11b 3/10
U.S. Cl. 340—213　　　　　　　　　　　　　　3 Claims

ABSTRACT OF THE DISCLOSURE

This invention relates to malfunction alarm annunciator systems and more particularly, to malfunction alarm annunciator systems for high energy charged particle accelerators. This invention was made in the course of, or under a contract with the United States Atomic Energy Commission.

Prior art

The customary aids in operating and monitoring large and complicated charged particle accelerators, comprise meters, pilot lights, oscilloscope points. The systems previously employed have been economically prohibitive to cover every condition and its interlocks. Moreover, the information has comprised simple on-off indication from remotely operated equipment and even if the operator has localized a fault or the exceeding of limits at such a remote location, it has been difficult or impossible to know the actual cause of the trouble without some kind of recording device. The conventional paper chart recorders, however, have been slow, cumbersome and economically prohibitive to cover every condition and its interlocks.

Experimental set-ups for high energy accelerators moreover, often have rather elaborate interlocking controls for protecting the apparatus, but it is not always possible to predict the proper operating limits. Until these limits are known, shut-down and experimental time-loss occur while looking for the faulty section. The temporary nature of the set-up and the inevitable rearrangements that the experimenter finds necessary in the course of the work, precludes building a custom alarm system. The operator of the accelerator is additionally mainly concerned with adjustments that directly affect the proton beam and only at times when the design limits are exceeded, causing major sections of the machine to shut down, does the operator look for the area of trouble, locate the problem and rectify the fault. It is thus essential that this expensive down-time be kept to a minimum by built-in diagnostic circuits in the controls.

It is thus an object of this invention to provide an economical and practical apparatus and method for quickly trouble-shooting the control system for accelerator apparatus, by providing a modular system that accepts either relays or alarm units without wiring changes and contains the essential circuitry of an annunciator for producing and displaying an alarm controlled by a memory signal;

It is a further object to provide sensing means that separates control and signal circuits;

It is a further object that the design permit the use of standard plug-in relays interchangeable with alarm modules without wiring changes;

It is a further object to provide interlock modules providing a sequence of simple on/off, interlock jumping, first off detection and momentary fault lock-in;

It is a further object to provide a trouble-shooting system for charged particle accelerators, having means for selectively by-passing interlocks;

It is a further object to provide a trouble-shooting system for charged particle accelerators having memory means and means for selectively suppressing and enabling the memory of said memory means;

It is a further object to provide interlock means that provide first to open fault signals and subsequent distinguishing fault signals without ambiguity;

A further object is to provide a malfunction alarm, annunciator system that will cause the least interference with the control system for an accelerator and the most rapid response to the operation of the control system for quickly trouble-shooting the control system when the design limits of the accelerator are exceeded.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

Description of the invention

The malfunction alarm system of this invention is useful for trouble shooting in accelerators, e.g. in the beam extraction, excitation control magnets for energy accelerators, such as the proton synchrotron at Princeton University. Other trouble-shooting use comprises the experimental area central control, the drift tube driver system, inflector 100 kv. power supply, bubble chamber magnet control and beam separator control. The control system for these systems is based on the logical functions of "and," "or," "not," "memory," etc. and simple, general purpose relays are employed. Consequently, this invention is useful in other systems employing these logical functions and such relays, particularly involving complicated and flexible experimental apparatus where it is essential to make frequent changes and to minimize down time by providing a rapid trouble shooting system for rapidly determining where, what and when specific operating and control limits are exceeded.

This invention contemplates a malfunction alarm annunciator for such accelerators and systems that operate on specific logic signals, and involves solid state, relay and contact components for independent sensing and control of said logic signals, and electronic memory means responsive to said solid state, relay and contact components for providing and displaying alarm signals that annunciate a plurality of specific logic signals and first-off of said plurality of logic signals. In one embodiment, the malfunction alarm annunciator of this invention comprises a plug-in alarm module having solid-state circuitry for memory/alarm and relay contact circuits for sensing and control, indicator light means for annunciating particular faults sensed by said alarm module, flashing, bus and audible alarm lines having memory means for subsequently annunciating particular faults sensed by said alarm module, and means connected with said alarm module for acknowledging particular faults annunciated by said alarm module and re-setting said alarm module for subsequent annunciations by said indicator light means and said flashing bus and alarm line means. With the proper selection of components as described in more detail hereinafter, the desired malfunction alarm annunciation is provided.

In the drawings where like elements are referenced alike:

Figure 1:
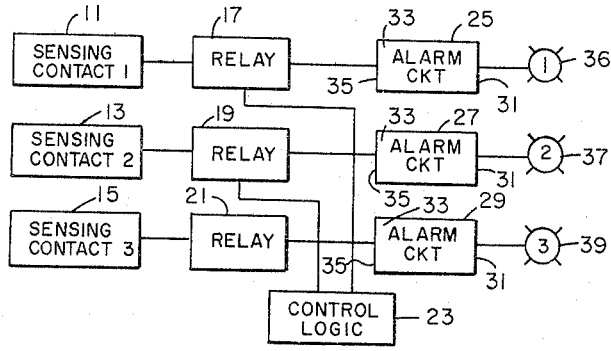
FIG. 1 is a block diagram illustration of principles involved in this invention wherein there is shown a malfunction alarm system block diagram using relays to isolate circuits.
Figure 3:
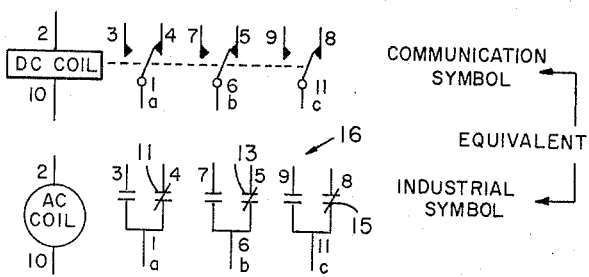
FIG. 3 is a partial schematic diagram of a general purpose plug-in relay.

Referring to FIG. 1, a portion of a typical experimental system is shown wherein suitable sensing contacts 11, 13 and 15 provide typical logical function signals, such as "and," "or," "not," "memory" signals or like signals, which are distributed by conventional relays, like relay 16 shown in FIG. 3. These signals thereupon trip their respective relays, such as relays 17, 19 and 21, which in turn suitably actuate their respective control logic such as logic 23 for controlling a portion of the accelerator system, such as the beam extraction excitation magnets. Relays 17, 19 and 21 likewise respectively energize the alarm units of this invention, such as units 25, 27 and 29, without interference with the control logic, for example, logic 23, or the system controlled thereby. These relays 17, 19 and 21 are miniature relays having two pole double throw contacts, as distinguished from the general purpose three pole relay 16 illustrated in FIG. 3. However, the modules 25, 27 and 29 comprise transistorized circuitry with the miniature relays 17, 19 and 21 assembled in a plug-in housing very similar to the commercially made general purpose relay 16 plug-in system so as to be inter-changeable therewith in their plug-in ability.

All these alarm units, 25, 27 and 29, are plug-in modules having transparent dust covers 31 enclosing circuit elements 33 wired in octal style, eleven pin, plug-in headers 35, which are identified by letter and color code for providing the desired malfunction alarm annunciation, for example, in lights 36, 37 and 39. All these units contain the same basic circuit module 33, having elements arranged slightly differently depending on their specific function, as described in more detail hereinafter. For ease of explanation a D unit 27 will be described first.

Figure 5:
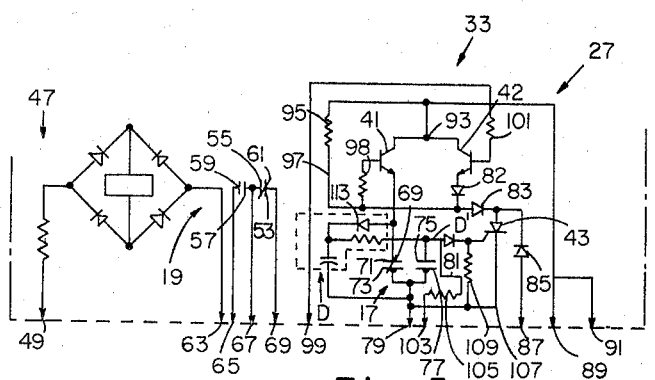
FIG. 5 is a partial unit wiring diagram of another embodiment D of the module shown in FIG. 4.

Referring to FIG. 5, the D circuit module 33 of unit 27, comprises transistor lamp drivers 41 and 42, silicon controlled rectifier 43 for memory, and a miniature relay 19 for circuit isolation. Resistor and diode bridge 47 advantageously operate on 115 v. service with a 6000 ohm relay through plug-in pins 49 and 51. However, for 28 v. service using a 900Ω relay, no resistor or bridge is used, in which case the pins 49 and 51 are merely connected.

The control circuit, comprising sense contacts 13 and contacts 53, 55, 57, 59 and armature 61 of relay 19, illustrated in FIG. 5, are connected through pins 63, 65, 67 and 69 to control logic 23. To this end the armature 61 connects pins 67 and 69 in a first logic position through contacts 53 and 55 and armature 61 connects pins 65 and 63 in a second logic position through contacts 57 and 59. When armature 61 is in the first logic position, armature 69 connects contacts 71 and 73 in a first logic position and when armature 61 is in the second logic position, armature 69 connects contacts 75 and 77 in a second logic position.

In the first position, contacts of armature 69 connects a 28 v. source through pin 79 and contacts 71 and 73 to the emitter of transistor lamp driver 41. When armature 69 is in its second position, this source connects through pin 79, contacts 75 and 77 and diode 81 to the gate of silicon controlled rectifier 43, which makes a low resistance path to the cathode. Transistor 42 has its emitter connected through diodes 82 and 83 with one side of this SCR 43. This emitter also is connected to diode 85, which is connected to alarm line pin 87. Pilot light pin 89 and pin 91 connect with the collectors of transistors 41 and 42 through common junction 93 and with diode 83 through resistor 95 and lead 97. Lead 97 connects with the base of transistor 41 through resistor 98 and the base of transistor 42 connects with signal pin 99 through resistor 101. The cathode of SCR 43 also connects with alarm trigger pin 103 through diode 81 and resistor 105, and connects with pin 79 through resistor 109. The remaining or other side of SCR 43, not mentioned above, connects with pin 79 through lead 107. RC network D has a connection to pin 79 and diode 113, which is connected to lead 97.

In operation, the D-unit memory 43 of circuit 33 of module 27 is not externally suppressed and it is ready to alarm whenever an off-normal condition is detected. It indicates a fault audibly and by a flashing pilot light. When the operator acknowledges and resets the alarm, the audible signal is silenced and the pilot light changes to steady on, which in turn, goes off by itself when the condition returns to normal. Each D unit 27 functions independently, indicating faults as they occur. If several alarms happen together, each pilot light will flash. The alarm trips on any fault lasting longer than five milliseconds.

When the external sensing contact 13 (FIGURE 1) closes, the minature relay 19 in the module is energized causing the control contacts of relay 19, namely interlock control contacts 59, 57, 55 and 53 to transfer, thus fulfilling a step in the interlock logic of the accelerator control system. At the same time contacts 75 and 77 close putting a short across the gate-cathode circuit of the silicon controlled rectifier 43, thus preventing this silicon controlled rectifier from turning on. The capacitor in RC circuit D now charges through diode 113, transistor 41 and lamp indicator 37 (FIGURE 1). Upon fault, the external sensing contact causes relay 19 to be de-energized so that the contacts 75 and 77 open allowing the stored energy in the capacitor of RC circuit D to trigger the gate of SCR 43. The other pole of the relay 19, through contacts 59, 57, 55 and 53, causes shutdown of the system.

Figure 2:
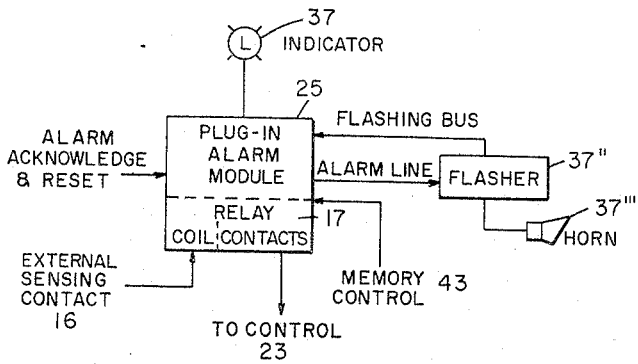
FIG. 2 is a partial block diagram of a typical alarm unit of this invention with a chart showning operational steps thereof.

With the SCR 43 turned on the indicator lamp 37″ shown in FIG. 2, is flashed on and off by way of diode 85 and pin 87 and will continue regardless of the condition of the external sensing contact 13. In this way the SCR 43 can be regarded as a memory, whereupon the operator can acknowledge the flashing and/or an audible signal 37‴ connected with the flashing signal by using a silence reset switch. This reset action causes a momentary interruption of power to the module circuit allowing the conducting SCR 43 to turn off. The light 37, then remains on steady and the cycle of operation begins again at the beginning.

In view of the above operation, when the interlock sensing contacts open on fault, it causes an interruption of current to their control logic 23. Similarly, a break anywhere in this circuit, loss of power, or a defect in the coil of relay 19 will prevent or shut down the operation to which the sensing contacts and control logic 23 are connected. This is a self-checking capability preferred for accelerator controls. Other alarm circuits, such as units 25 and 29, are likewise connected to other like relays such as relays 17 and 21, and also connected with the control logic 23.

Figure 4:
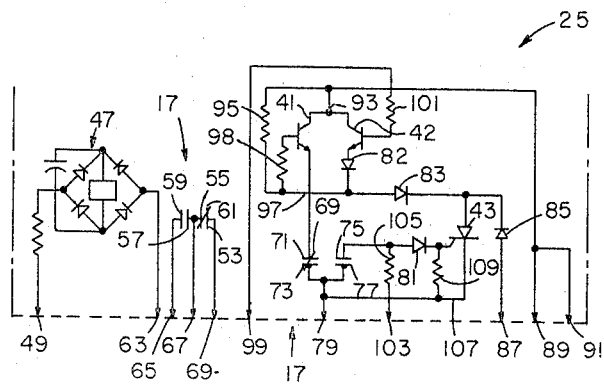
FIG. 4 is a partial unit wiring diagram of the malfunction alarm plug-in module C of this invention.

Referring to FIG. 4, the plug in C unit 25 is used when the accelerator system is being turned on or is in a standby condition when some interlocks are open or closed but of no consequence. To prevent unwarranted alarm indications at this time, the memory signal to SCR 43 of the C unit 25 is suppressed. After the equipment of the accelerator system is fully operational, a memory signal is turned on automatically to enable the SCR 43 should a fault occur. When the equipment shuts down normally, the alarm signal on pin 103 is removed immediately. If, on the other hand, a fault happens while the accelerator system is running, the off-normal condition will, in addition to causing shut down, be shown by a flasher pilot light and a pulsing audible signal. Acknowledgement and re-set of the alarm resumes normal operation.

In the series of interlocks connected to the C units, the first to open on fault signals by the flashing of a pilot light and subsequent faults in the group produce a distinguishing steady light signal. The resolution between events in the first-off circuit is about 10 microseconds. Since the contact transfer time of the average interlock switch or relay takes more than four milliseconds, ambiguity of indication is substantially eliminated.

Figure 6:
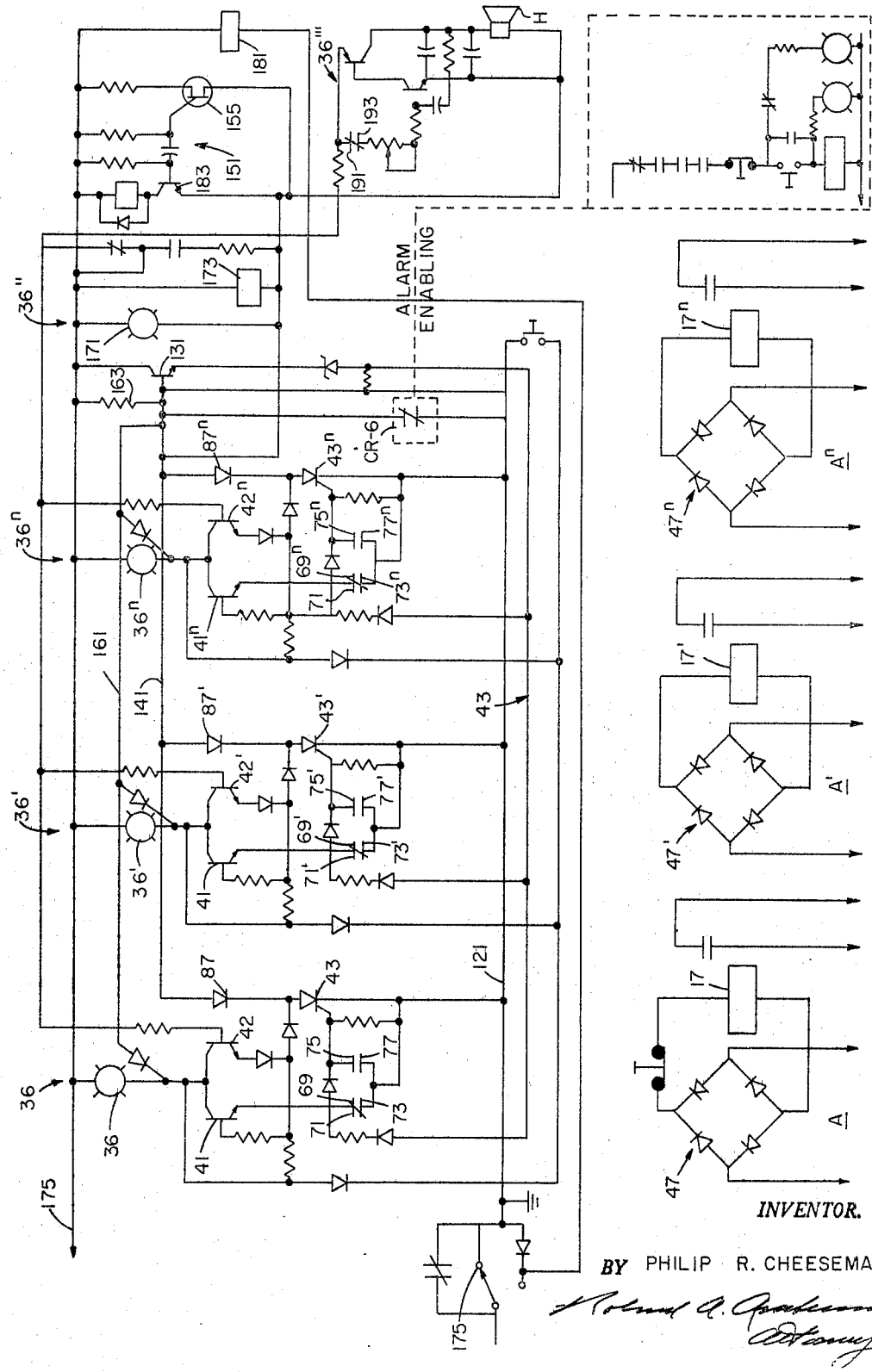
FIG. 6 is a partial schematic wiring diagram of the first to open annunciator and re-set system for the module of FIG. 4.

Referring to FIG. 6, which is a partial schematic illustration of two first to open C units, such as the described unit 25, each unit comprises transistor lamp drivers 41 and 42, a silicon controlled rectifier (SCR) 43 for memory and a miniature relay 17 for circuit isolation. Part of the switching for the pilot light 36 is done by the NPN silicon transistors 41 and 42. The low cost transistors, type 2N2270, can be shut off without the need of a negative base supply. The negligible amount of current that flows through the transistor operating near the cut-off region is so small that no light is visible from the bulb. The units are referred to as units 36, 36′ and 36ⁿ and the elements of the units are distinguished by corresponding prime designations.

Initially, with the interlock open, the relay 17 is de-energized. The normally open contacts 75 and 77 provide a path to the 28 v. line 121 for the emitter of transistor 41. The base of transistor 41 is biased on by a positive voltage through the filament of pilot light 36, 5K resistor 95 and 15K resistor 98. Transistor 41 conducts near saturation thus turning on the pilot light 36. This function applies to each of the other interlock pilot light combinations in the circuit, e.g., the combination with unit 36′ and pilot light 36′.

When the interlock contacts close, the relay also closes causing contacts 71 and 73 to open and contacts 75 and 77 to close. This opens the emitter lead of the lamp driver transistor 41 and shuts off the pilot light 36. Additionally, contacts 75 and 77 place a short across the gate 17 to the cathode of the small silicon controlled rectifier 43 through diode 81. If the interlock re-opens at this point of the sequence, the pilot simply relights as in the initial step.

When all the interlocks are closed thereby satisfying the control logic 23, the above-mentioned accelerator magnet excitation supply systems such as A, A′ and Aⁿ are ready for operation. With the command to operate the system, a shorting contact on the control relay CR-b opens in the base circuit of transistor 131 making it positively biased. The emitter of this transistor 131 energizes the alarm bus 43 that connects all the alarm units. The alarm signal is present the whole time that the systems, A, A′ and Aⁿ operate, and is ready to fire any of the SCR's 43, 43′ or 43ⁿ with an open relay gate such as gate 17. However, in normal shutdown, the control relay CR turns off the alarm signal and any interlock that opens as a consequence of this shut-off command cannot alarm without this memory voltage.

If an A system interlock opens while the outer systems A′ and Aⁿ operate, the contacts 71 and 73 open and contacts 75 and 77 close. In the first few microseconds of the travel of armature 69, the memory voltage appears on the gate 17 and fires the SCR 43. This conducting SCR 43 brings the alarm line 141 down to about 1 volt or essentially negative. Since the base of transistor 131 connects with the alarm line 141, this less positive voltage causes transistor 131 to stop conducting. This action turns off the alarm memory of SCR 43 in a few microseconds preventing any subsequent interlocks that may open from firing their SCR, e.g. 43′ or 43ⁿ.

The alarm line 141 also turns on several other circuits, e.g., the lamp flasher 36″, comprising a unijunction flip-flop circuit 151. The unijunction transistor 153 has small emitter reverse current characteristics that are ideal for timing and low frequency oscillator circuits. Although the flasher 36″ drives the base circuits of transistors 42, 42′ and 42ⁿ, only the one having the conducting SCR is complete to its pilot light. Thus, only this lamp flashes as the transistor in series with it is driven alternately from cut-off to saturation. Diodes 87, 87′ and 87ⁿ block the emitter paths to this SCR preventing other lights from flashing. These lights, however, can come on steady to indicate if their interlock opens and the interlock state does not affect the flashing pilot light. In the latter case, the base of transistor 41 is biased low enough by its conducting SCR 43 to limit the bulb current through transistor 41 to a low value.

Logically for indication only, the time to energize the alarm trigger in many systems occurs when the control relay (CR) turns on the entire system. By eliminating the control relay the signal that turns on the alarm signal comes from the sequence sense bus 161. This line connects with the base of transistor 131, which cuts off as long as any of the pilot lights remain lit. When conditions become normal, the interlocks switch off all the pilot lights. The sequence bus 161, no longer having a negative path, now becomes positive through 10K resistor 163 to 28 volts. This positive voltage on the base of transistor 131 makes it conduct, turning on the alarm signal 43.

Once triggered, the SCR continues to conduct as long as a minimum current (e.g. 10 ma.) is supplied thereto. The alarm signals advantageously by a showing of a red pilot light, e.g. light 171, by means of alarm relay 173. This ensures that the operator acknowledges the cause of the shut-down with re-set switch 175 before attempting to re-start the system. The alarm relay 173 and the red pilot light 171 connect from the +28 volt line 175 to the alarm line 141 and serve as a keep-alive load for the active SCR.

Audible alarm 36‴ also alerts the operator of an alarm condition by means of pulses from lamp flasher 36″, which turns on and off a transistorized audio oscillator which feeds about ½ watt to a small 2½ inch loudspeaker H.

The operator silences the horn without losing the flashing light signal and acknowledges the alarm by means of switch 175, and relay 181, which opens upon command from switch 175 to cut-off the pulses from flasher 36″ to the horn 36‴. To this end contacts 191 and 193 in this relay 181 shut off the horn 36‴ from the pulses from flasher 36″. Other contacts in relay 181 open in preparation of the reset pulse, which comprises a short break of current flow cause by switch 175 when it moves back to its re-set position. The contacts of this switch 175 transfer in approximately 3 to 5 milliseconds, during which time the circuit opens long enough for the conducting SCR to clear. The cycle is complete after acknowledgement of the alarm and the system is then ready for the next operation.

A typical sequence of operation is as follows:

TABLE I.—FIRST-OFF SEQUENCE

| Operation | Control Indication | | | | | | Circuit Function Conducting=1, NC=0 | | | |
|---|---|---|---|---|---|---|---|---|---|---|
| | Interlock Contact | Equipment (via CR) | Audible Signal | Interlock Pilot Lt. | Ready Pilot Lt. | Relay M | Q-1 | Q-2 | SCR | Q-3 |
| Begin | Open | Off | Off | Lit steady | Out | Open | 1 | 0 | 0 | 0 |
| Ready | Closed | Off | Off | Out | Lit | Closed | 0 | 0 | 0 | 0 |
| Run | do | On | Off | Out | Out | do | 0 | 0 | 0 | 1 |
| 1st alarm | Open | Off | Sounding | Flashing | Out | Open | 0 | 0-1 | 1 | 0 |
| Subsequent alarms | do | Off | | Steady | Out | do | 1 | 0 | 0 | 0 |
| Acknowledge | | | Off | Flashing | | | | | | |
| Reset (begin) | Open | Off | Off | Steady | Out | Open | 1 | 0 | 0 | 0 |

The malfunction alarm system of this invention has the advantage of providing a practical and efficient troubleshooting system for complicated experimental equipment, such as high energy particle accelerators that involve temporary or frequent rearrangements. Actual use of this invention in connection with a proton synchrotron has shown it to be effective and efficient in frequently and sequentially annuciating first-off and other faults for rapid correction thereof thereby to minimize down-time of the accelerator when operating limits have been inadvertently exceeded. This invention moreover, has the advantages over conventional equipment of simplicity, compactness, reliability and adaptability for a wide range of troubleshooting applications with simple plug-in modules having solid-state and memory circuits that annunciate a plurality of specific faults quickly, accurately and unambiguously while operating with existing accelerator controls and control logic and preventing interference therewith.

This invention comprises simple, modular units for locating faults in accelerator controls in cases of malfunction by providing solid state circuitry for memory-alarm in combination with relay logic for control and for responding to particular faults as well as subsequently indicating what those faults were.

What is claimed is:
1. A malfunction alarm for apparatus operating on specific logic signals consisting of a system of interconnected relays having contacts that independently sense and control said logic signals, and electronic memory means responsive to said contacts for providing and displaying alarm signals that specifically annunciate a plurality of said logic signals and their sequence, said memory means comprising a plurality of modules having a pair of transistors with selective conduction states that are controlled by said contacts, and a silicon controlled rectifier that is responsive as a memory to said conduction states of said pair of transistors for annunciation thereof at intervals subsequent to their changes.

2. The invention of claim 1 in which said transistors have visual and audible alarm means for annunciating said conduction states, thereby to provide and display distinct annunication of said conduction states in correspondence with specifics of said logic signals.

3. A malfunction alarm for apparatus operating on specific logic signals, comprising relays responsive to specific of said logic signals, first and second contacts responsive to individual of said relays for communicating said specific logic signals, said first contacts for controlling said apparatus and said second contacts being responsive to said specific logic signals for independently sensing said specific logic signals, two transistors having conducting and non-conducting states that are selectively controlled by said logic signals sensed by said second contacts, annunciator means responsive to said specific changes in the conducting states of said transistors, and silicon controlled rectifier means responsive to said changes in the conducting states of said transistors for the memory storage thereof, for actuating said annunciator means for annunciating said changes in said transistor conducting states at intervals subsequent to the time thereof for annunciating a plurality of said specific logic signals and their sequence.

References Cited

UNITED STATES PATENTS 3,108,262  10/1963  Saba _____ 340—213
3,138,791  6/1964  Beguin _____ 340—213.1
3,251,049  5/1966  Hallerberg _____ 340—213.1

JOHN W. CALDWELL, Primary Examiner
CHARLES M. MARMELSTEIN, Assistant Examiner

U.S. Cl. X.R.
340—415